May 29, 1934.  J. G. VINCENT  1,960,358
BRAKE OPERATING MECHANISM
Filed Dec. 30, 1929
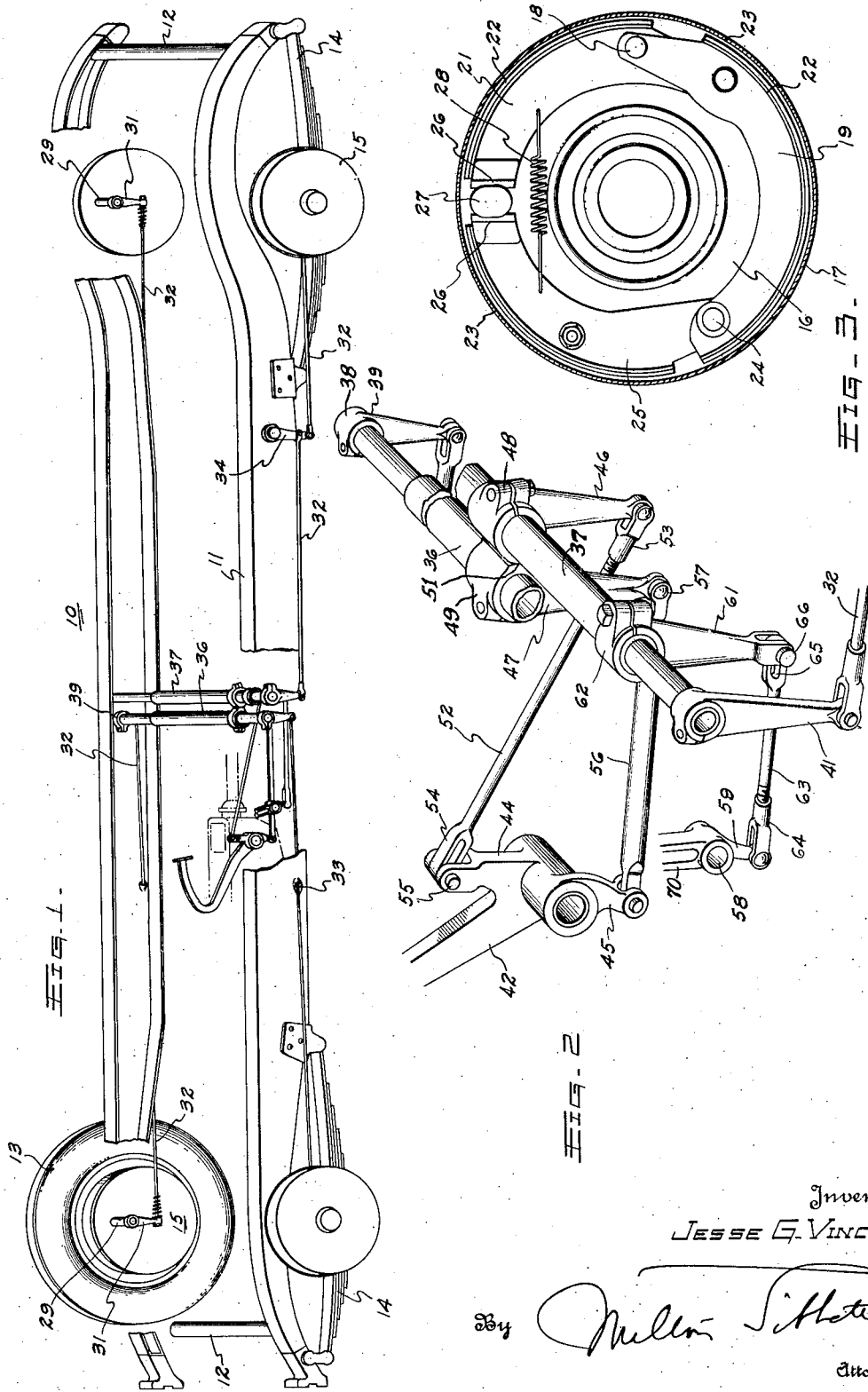
Inventor
JESSE G. VINCENT
Attorney Patented May 29, 1934

1,960,358

UNITED STATES PATENT OFFICE 1,960,358

BRAKE OPERATING MECHANISM

Jesse G. Vincent, Detroit, Mich., assignor to Packard Motor Car Company, Detroit, Mich., a corporation of Michigan Application December 30, 1929, Serial No. 417,362

8 Claims. (Cl. 188—10)

This invention relates to motor vehicles and particularly to the brake mechanism of such vehicles.

Vehicles have been heretofore provided with brakes which are applied by the vehicle operator from a suitable lever, usually a pedal, through equalizing and apportioning mechanism adapted to equalize and predetermine the division of force between the several brake shoes. Such mechanism usually has considerable lost motion in its various joints, and also an appreciable amount of yield or spring in the connecting linkage and particularly in the equalizer levers, so that a large movement of the operating pedal has frequently been necessary to secure a relatively small pressure of the brake shoes on their drums. As the permissible pedal travel is limited, this lost motion and deformation of the mechanism has sometimes resulted in the operator completely depressing the pedal without securing the braking effect needed, particularly in an emergency.

In consequence of this it has become common practice to use friction lining for the brake shoes having a high coefficient of friction, in order that the relatively feeble pressures available at the brake drums may sufficiently retard the vehicle. The action of such linings, however, varies considerably with the operating conditions, such as the presence of moisture and dirt, and frequently brakes of this character, when set to produce a normal braking effect when dry, will greatly increase in effectiveness when exposed to moisture or dust, and become so violent as to make the brakes grab, and sometimes lock. This evil is pronounced in high-friction brake lining, and particularly when used in brakes of the servo type, in which the pressure of a main brake shoe on the drum is provided by the frictional drag of a pilot shoe which is directly applied to the drum by the operating mechanism.

One of the objects of this invention is to provide a simple and effective mechanism for operating vehicle brakes which will efficiently transmit a high percentage of the applied effort to the brake shoes with a minimum of lost motion and in which distortion of the parts will be relatively small.

Another object of the invention is to provide such a brake mechanism which will transmit ample braking force to the brake shoes within reasonable limits of pedal travel.

A further object of the invention is to provide a brake mechanism sufficiently effective to permit the use of brake linings having relatively low coefficients of friction.

Other objects of the invention will appear from the following description taken in connection with the drawing, which forms a part of this specification, and in which:

Fig. 1 is a perspective view, partially broken away, of part of the chassis of a motor vehicle provided with a brake mechanism constructed in accordance with this invention;

Fig. 2 is a perspective view to a larger scale of the brake operating mechanism shown in Fig. 1, and Fig. 3 is a view in elevation of a brake mechanism suitable for the retardation of the wheels of a motor vehicle.

Referring to the drawing, at 10 is shown part of the chassis of a motor vehicle, having side frame members 11 connected by cross members such as 12 to form the vehicle frame. The vehicle frame is mounted upon suitable wheels, one of which is shown at 13, which are associated in pairs at the front and rear of the vehicle in the well-known manner, and is directly supported on springs 14 of conventional construction. This frame is adapted to support a suitable vehicle body, an engine, and transmission mechanism through which the rear wheels are driven from the engine to propel the vehicle, but as such construction is well known in the art to which this invention relates, it has not been illustrated in the drawing, and further description thereof is unnecessary.

Each of the vehicle wheels 13 is preferably provided with a suitable braking device as indicated at 15, which is preferably of the servo-type shown in Fig. 3. This device 15 comprises a supporting plate 16, fixed in any convenient manner as to the vehicle axle adjacent the wheel, and surrounded by a brake drum 17, secured to and rotatable with the wheel hub. Pivoted to the plate 16, as at 18, is a main brake shoe 19 and an auxiliary shoe 21, each provided with suitable friction lining 22 and each adapted to be moved about the pivot 18 into braking engagement with the flange 23 of the brake drum 17. Pivotally connected to the main shoe 19, as at 24, is a pilot shoe 25 also provided with friction lining 22, which is adapted to be moved about its pivot 24 into braking engagement with the flange 23. The ends of the shoes 21 and 25 are provided with opposed abutments 26 which are engaged by a cam 27 to expand the shoes 21 and 25 into braking engagement with the drum flange 23 against the action of a spring 28 connected therebetween. Upon engagement of the pilot shoe 25 with the moving drum flange, there is a tendency for this shoe to move with the drum in the direction of rotation thereof, and by reason of its connection 24 to the main shoe 19, the force so applied by the pilot shoe is exerted to force the main shoe 19 into operative braking engagement with the drum.

The cam 27 is formed on or connected to a shaft 29, suitably mounted to oscillate in the plate 16, which shaft projects through the plate and is provided at its inner end with an arm 31. The arms 31 of each of the brakes is provided at its end with a connection to a brake applying means 32 which may be either a cable or a rod as desired. In the embodiment illustrated the means 32 connected to the front brakes of the vehicle consists of cables, each of which passes through an opening 33 in the side frame member 11, while in the rear brake operating means it consists of a linkage of tension rods having a multiplying lever 34 interposed therein. It will be evident that a pull exerted by the means 32 on the arm 31 will rock the cam 27 about its axis, separate the brake shoes 21 and 25, and apply these to the respective flanges of the vehicle wheels 13, thus retarding the vehicle in the well-known manner.

For operating the brakes through the device above described, this invention provides a mechanism mounted on the vehicle frame intermediate the ends thereof, and comprising a pair of spaced rock shafts 36 and 37, preferably tubular in construction, extending across the frame and journaled in suitable bearings (not shown) carried thereby. The shaft 36 is adapted to operate the brakes on the front wheels of the vehicle, and for this purpose is provided with a pair of lever arms 38, having hubs 39 which are keyed and clamped, or otherwise rigidly secured to the shaft, one of these arms 38 being located inside of and close to each of the side frame members 11. The lower ends of these arms 38 are connected to the rear ends of the cables 32, so that oscillatory motion of the shaft and its arms will exert a pull on the front brake arms 31, applying the front brakes in the well-known manner.

The shaft 37 is similar in construction to the shaft 36, but is somewhat longer and its ends project through openings in the members 11 and are provided with lever arms 41, connected to the brake rods 32 for the rear brakes. Oscillatory movement of the shaft 37 and its arms 41 will thus cause a corresponding movement of the rear brake arms 31, applying the rear brakes.

It will be evident that in applying the front and rear brakes the shafts 36 and 37 and their respective lever arms, rotate in opposite directions, the shaft 36 turning counter-clockwise and the shaft 37 turning clockwise as viewed in Figs. 1 and 2. This movement of the shafts is effected through a suitable operating lever 42, which as shown is in the form of the usual brake pedal. This lever is journaled on a suitable bearing 43, carried by the vehicle, which may be conveniently supported by the side of the vehicle transmission housing. In addition to the pedal arm, the lever 42 has a pair of oppositely disposed arms 44 and 45, which extend substantially up and down respectively from the pivot 43 in the embodiment of the invention illustrated. These arms are slightly offset transversely of the vehicle and are connected to and adapted to operate the rock shafts 37 and 36. For this purpose the shafts are provided with lever arms 46 and 47, which arms are rigidly secured to their respective shafts in any convenient manner, and are also transversely offset, so that levers 44 and 46 are in line and levers 45 and 47 are in line longitudinally of the vehicle. The hubs 48 and 49 of the levers 46 and 47 are preferably provided with cylindrical portions which extend in opposite directions to make rolling contact, as shown at 51. In this way each of the shafts has a bearing on the other shaft at this point, and this operates to reduce the deflection due to bending of the shafts under load.

The arm 44 is connected to the arm 46 by a tension connection or tie rod 52, which is adjustable in length as by means of a clevis 53 threaded to the rear end thereof. The front end of rod 52 is provided with a slot 54, connected to the arm 44 by a pin 55, thus providing a lost motion connection which permits the shaft 37 to be actuated otherwise than by the arm 46 without moving the lever 42, and also prevents the imposition of thrust loads on the tension rod 52. The arm 45 is connected to the arm 47 by a compression connection or strut 56 through a clevis 57 threaded to the rear end thereof, which construction permits adjustment in length of the thrust member 56. It will be apparent that this device provides for opposite oscillation of the shafts 36 and 37 upon depression of the pedal lever 42 by the vehicle operator.

Provision is also made for applying brakes to the vehicle wheels, or to some of them, by means other than the pedal 42. To this end a separate lever 70 is provided which may be the usual hand or "emergency" brake lever of the vehicle. This lever is fulcrumed upon a suitable bearing 58 on the vehicle frame, and it has a depending arm 59, in line with which is an arm 61. This arm 61 is keyed and clamped to the shaft 37 intermediate the arms 41 and 46 by a hub 62. The arms 59 and 61 are connected by a link 63, to the forward end of which is threaded a clevis 64 by which it may be adjustably connected to the lever arm 59. The rear end of the link 63 is provided with a slot 65 which cooperates with a pin 66, by which it is connected to the end of the arm 61, thus providing for lost motion at this point. Upon operation of the shaft 37 through the arm 46 from the pedal 42 and the connections therebetween, the pin 66 will move forwardly in the slot 65 without affecting the lever 70 in any way. Similarly, upon operation of the shaft 37 through the arm 61 from the lever 70 and the connections therebetween, the slot 54 will move forwardly on the pin 55 without affecting the lever 42 in any way.

It will be evident that this mechanism provides a simple actuating linkage by which the brake applying means 32 may be efficiently operated, with a minimum of lost motion and substantially no distortion, so that a high percentage of the effort applied by the vehicle operator is transmitted to the brakes, and is available for applying the shoes thereof to the brake drums 17. By reason of the efficiency of the mechanism thus described, friction linings may be used having a lower frictional coefficient and of more uniform characteristics thus preventing material variations in the operation of the brakes upon variation in the operating conditions.

While a specific embodiment of the invention has been herein described, which is deemed to be new and advantageous and may be specifically claimed, it is not to be understood that the invention is limited to the exact details of the construction, as it will be apparent that changes may be made therein without departing from the spirit or scope of the invention.

Having thus described the invention, what is claimed and desired to be secured by Letters Patent is:

1. A brake operating mechanism for motor vehicle brakes comprising a pair of rock shafts operatively connected to said brakes, an operating lever, a tension link connecting the lever to rock one of the shafts, and a compression strut connecting the lever simultaneously to rock the other shaft.

2. A brake operating mechanism for motor vehicles having front and rear brakes, comprising a rock shaft operatively connected to the front brakes, a rock shaft operatively connected to the rear brakes, arms on said rock shafts, a lever having a pair of arms, and tension and compression members respectively connecting the arms of said lever to the arms on said shafts simultaneously to rock the shafts.

3. A brake operating mechanism for motor vehicles having front and rear brakes arranged in sets, a separate rock shaft connected to operate each set of brakes, arms secured to said shaft and extending in the same direction therefrom, a lever having oppositely disposed arms, a tension member connecting one of the lever arms to one of the shaft arms, and a compression member connecting the other lever arm to the other shaft arm said levers simultaneously operating the brakes.

4. In a four-wheel brake system for motor vehicles comprising independent rock shafts, one of said shafts being connected to operate the front brakes, and the other of said shafts being connected to operate the rear brakes, a brake lever, a compression member, a tension member, and an arm connected to each rock shaft, said lever being connected to one arm by said tension member and to the other arm by said compression member, said members and arms rotating each rock shaft simultaneously upon movement of the lever and providing a brake action proportioined between the front and rear brakes.

5. A brake operating mechanism for motor vehicle brakes comprising a pair of operating shafts, each connected to some of said brakes, an operating lever, and tension and compression members between said lever and said shafts to rock them simultaneously in opposite directions upon movement of said lever, each of said members being connected to said shafts on the same side thereof.

6. A brake operating mechanism for motor vehicle brakes comprising a pair of operating shafts each connected to some of said brakes, arms on each shaft, an operating lever, and tension and compression members connecting the lever to the arms on the same side of the shafts to rock the shafts in opposite directions simultaneously.

7. A brake operating mechanism for motor vehicle brakes comprising a pair of operating shafts, each connected to some of said brakes, an operating lever, and tension and compression members between said lever and said shafts to rock them simultaneously in opposite directions upon movement of said lever.

8. A brake operating mechanism for motor vehicles having front and rear brakes comprising means to actuate the front brakes, separate means to actuate the rear brakes, a lever having a pair of arms, and tension and compression members between said actuating means and the arms of the lever, said members operating each of said actuating means in opposite directions simultaneously upon movement of the lever.

JESSE G. VINCENT.